(12) United States Patent
Giesler et al.

(10) Patent No.: US 11,858,084 B2
(45) Date of Patent: Jan. 2, 2024

(54) TOOL TURRET

(71) Applicant: SAUTER FEINMECHANIK GMBH, Metzingen (DE)

(72) Inventors: Steffen Giesler, Albstadt (DE); Marius Ewald, Metzingen (DE)

(73) Assignee: KOLIBRI BETEILIGUNGSGESELLSCHAFT MBH & CO. KGAA, Kleinmachnow (DE)

( * ) Notice: Subject to any disclaimer, the term of this patent is extended or adjusted under 35 U.S.C. 154(b) by 757 days.

(21) Appl. No.: 16/636,985

(22) PCT Filed: Aug. 9, 2018

(86) PCT No.: PCT/EP2018/071642
§ 371 (c)(1),
(2) Date: Feb. 6, 2020

(87) PCT Pub. No.: WO2019/034528
PCT Pub. Date: Feb. 21, 2019

(65) Prior Publication Data
US 2020/0254575 A1    Aug. 13, 2020

(30) Foreign Application Priority Data
Aug. 12, 2017   (DE) .................... 10 2017 007 648.0

(51) Int. Cl.
*B23Q 3/155* (2006.01)
*B23B 29/34* (2006.01)

(52) U.S. Cl.
CPC .......... *B23Q 3/15526* (2013.01); *B23B 29/34* (2013.01); *B23B 2240/04* (2013.01);
(Continued)

(58) Field of Classification Search
CPC ......... Y10T 483/1719; Y10T 483/1721; Y10T 82/2506; Y10T 82/2508; Y10T 82/2587;
(Continued)

(56) References Cited

U.S. PATENT DOCUMENTS 4,414,724 A    11/1983  Garnett
4,641,413 A *   2/1987  Hallqvist ............... B23Q 7/046
                                                        82/125

(Continued)

FOREIGN PATENT DOCUMENTS

CN         104190973 A  * 12/2014  ........... B23B 29/323
DE   10 2005 033 890       1/2007
(Continued)

OTHER PUBLICATIONS

International Search Report (ISR) dated Nov. 26, 2018 in International (PCT) Application No. PCT/EP2018/071642.

*Primary Examiner* — Sunil K Singh
*Assistant Examiner* — Michael Vitale
(74) *Attorney, Agent, or Firm* — WENDEROTH, LIND & PONACK, L.L.P.

(57) ABSTRACT

A tool turret, in particular intended for use in a machine tool, is for an automated tool change process. In a work station (7) of the pivotable tool disk (5), a holder (9) intended for receiving a machining tool (15) can be attached to the tool disk (5) in a re-detachable manner by a clamping device (31) assigned to the work station (7). In an adjusting position of the tool disk (5) that differs from the working position (11), the respective clamping device (31) can be activated or deactivated, while leaving the holder (9) on the tool disk (5). In a changing position of the tool disk different from the working (11) and adjusting positions (57), the clamping device (31) unlocks the holder (9) in such a way that the
(Continued)

holder can be removed from the tool disk (5) and replaced with another holder (9) to be used.

12 Claims, 8 Drawing Sheets

(52) U.S. Cl.
CPC .............. *B23Q 2003/15527* (2016.11); *B23Q 2003/15586* (2013.01); *B23Q 2220/002* (2013.01); *Y10T 483/1719* (2015.01)

(58) Field of Classification Search
CPC ........ B23Q 2003/15586; B23B 29/246; B23B 29/34; B23B 29/20; B23B 29/205
USPC .................. 483/24, 25; 82/120, 121, 159
See application file for complete search history.

(56) References Cited

U.S. PATENT DOCUMENTS

| | | | |
|---|---|---|---|
| 2011/0023276 A1* | 2/2011 | Jansen | .................... B23B 29/20 82/159 |
| 2011/0094355 A1 | 4/2011 | Sheehy et al. | |
| 2014/0157559 A1 | 6/2014 | Hessbrueggen | |
| 2017/0014965 A1* | 1/2017 | Baldaccini | .......... B23B 31/2072 |

FOREIGN PATENT DOCUMENTS

| | | | | |
|---|---|---|---|---|
| DE | 10 2012 104 490 | | 11/2013 | |
| DE | 10 2014 003 336 | | 9/2015 | |
| EP | 1642676 A1 | * | 4/2006 | .............. B23Q 39/02 |
| GB | 2021466 A | * | 12/1979 | .............. B23B 3/161 |
| GB | 2 144 668 | | 3/1985 | |
| KR | 100247859 B1 | * | 4/2000 | ........... B23Q 11/103 |

* cited by examiner

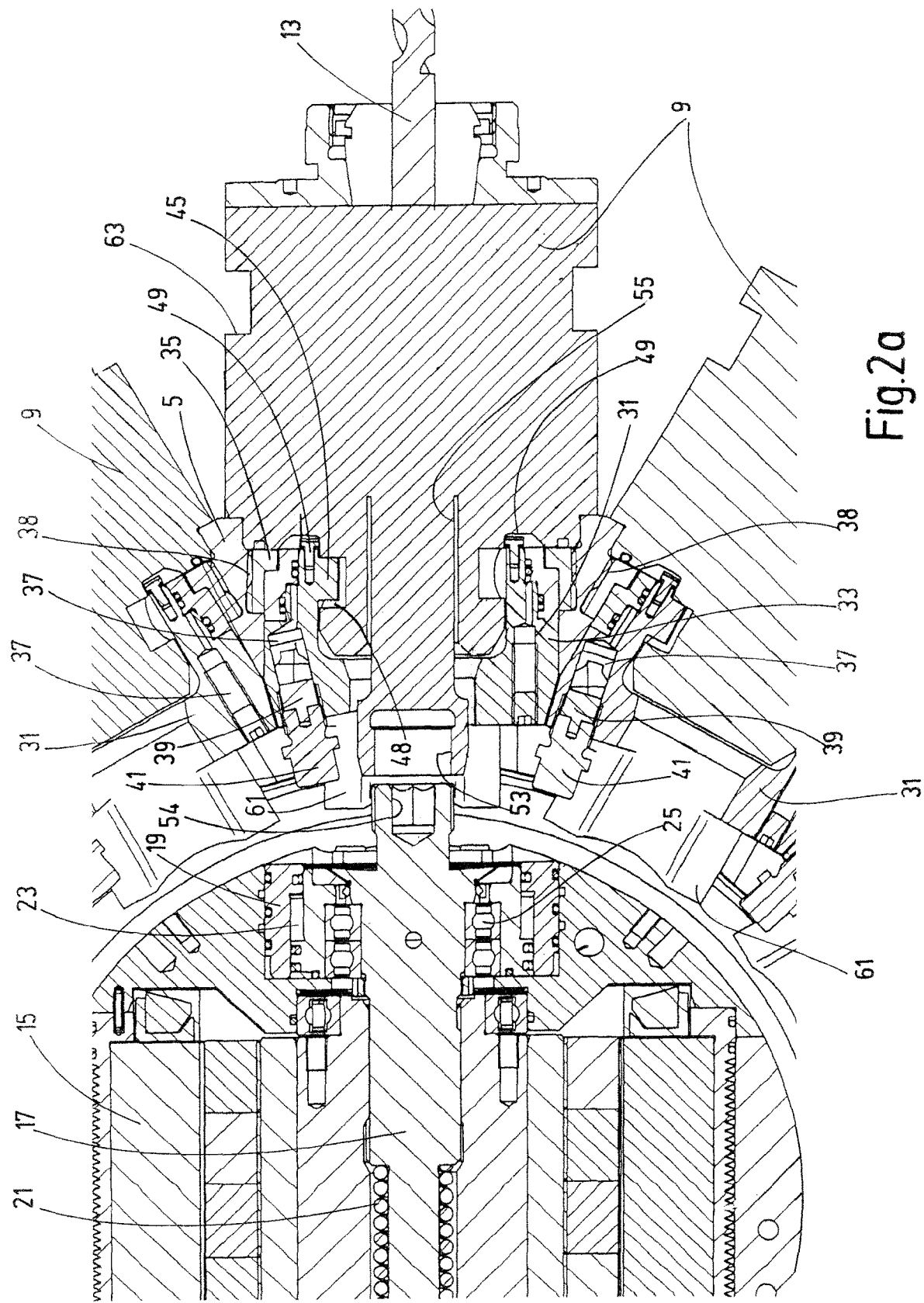

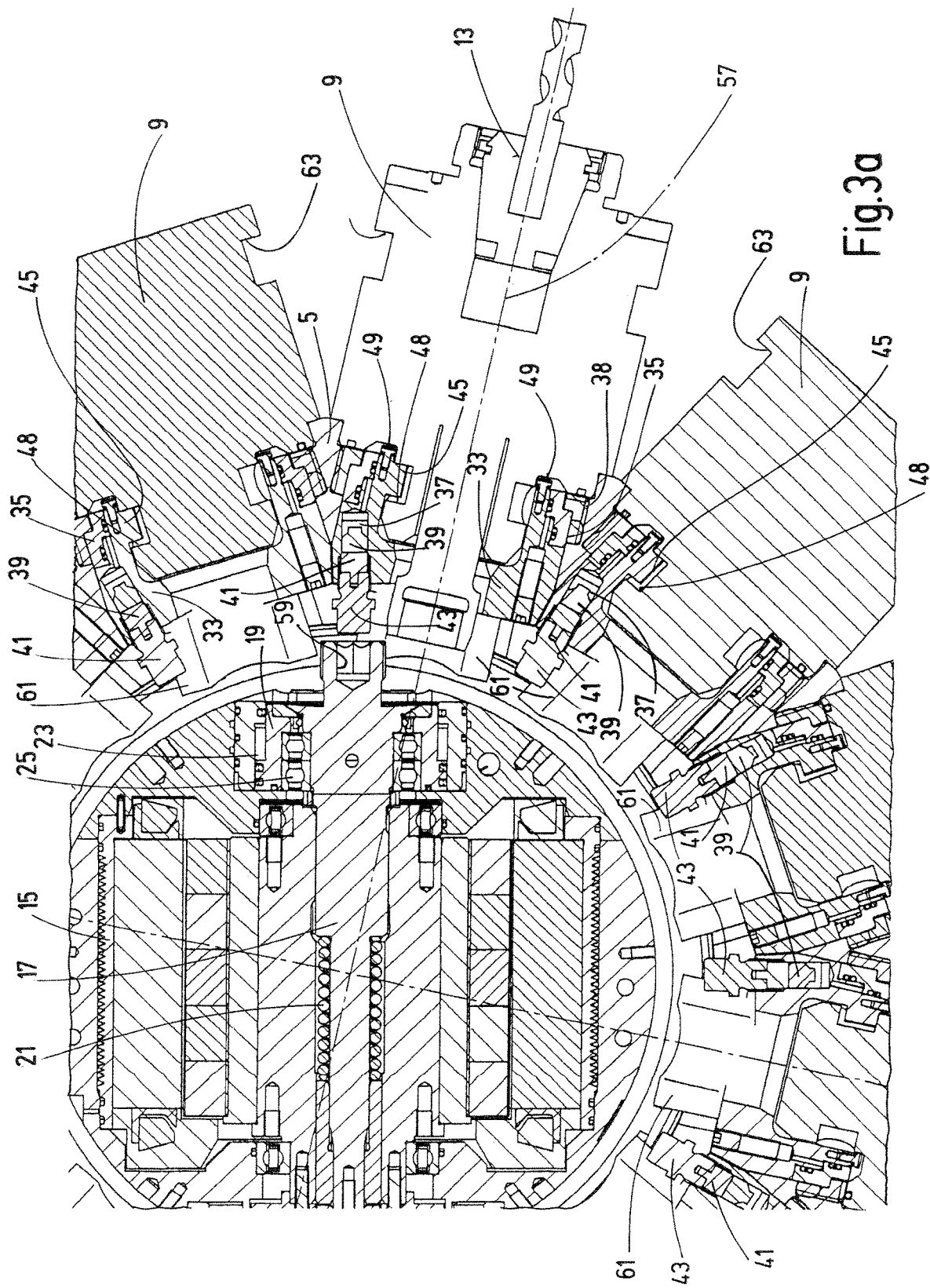

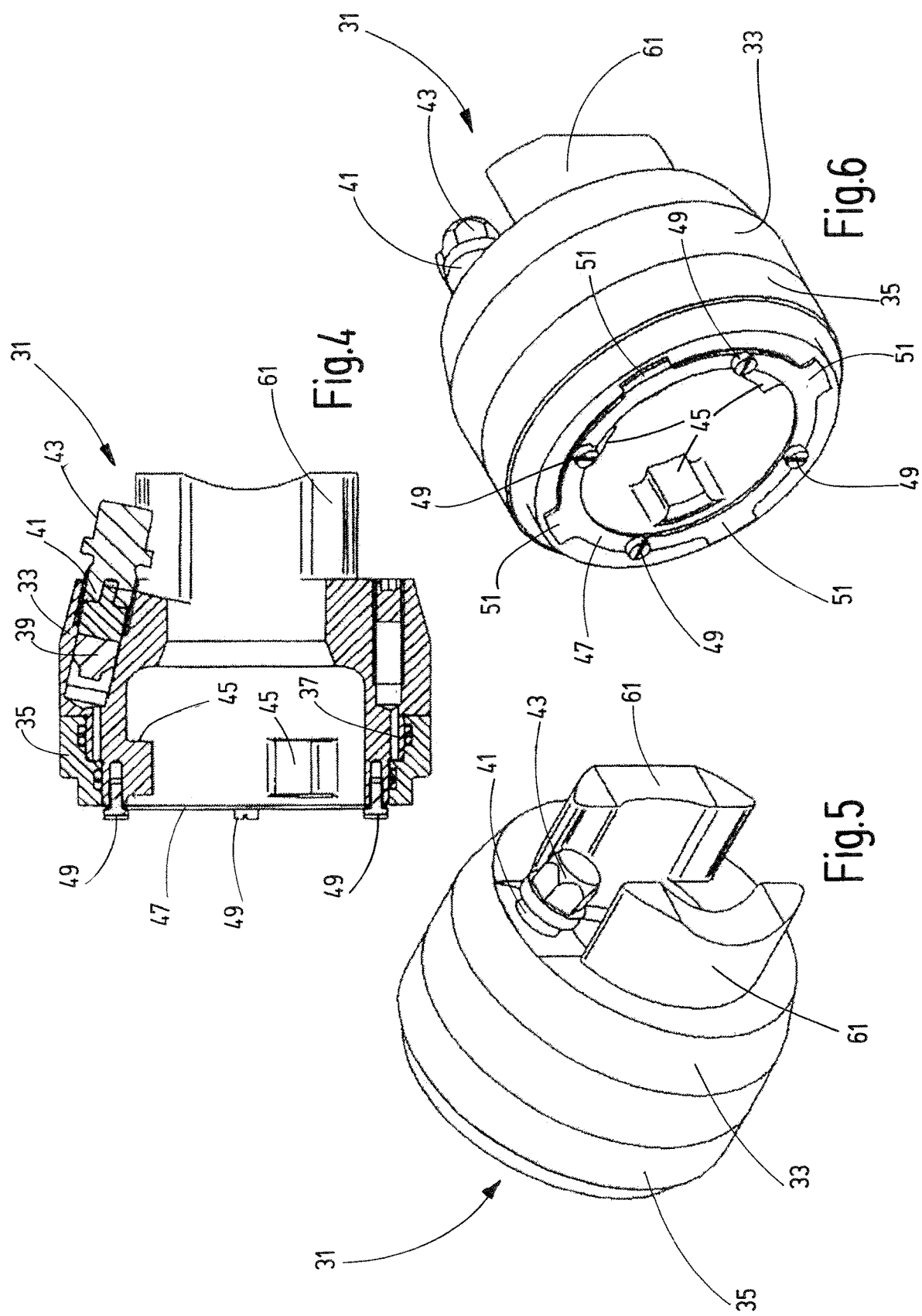

TOOL TURRET

FIELD OF THE INVENTION

The invention relates to a tool turret, especially intended for use on a machine tool.

BACKGROUND OF THE INVENTION

Various embodiments of tool turrets that can be attached to a machine tool are state of the art. As illustrated by DE 10 2005 033 890 A1 and DE 10 2014 003 336 A1 by way of example, such tool turrets usually have a base body, which can be connected to a suitable machine tool. A tool disk is rotatable on the base body about a turret axis. The tool disk has work stations, which can be fitted with machining tools. Selected work stations can be set to a working position by rotating the tool disk. The machining tools to be used are mainly tools for metal cutting, such as drilling, turning or milling tools. To adapt to different machining tasks, change operations have to be performed, in which a machining tool located in a particular working position is exchanged and replaced by a different type of machining tool. For certain manufacturing tasks, such as workpieces for the production of small series, the machining tools have to be changed frequently. This changing results in a considerable amount of work for the operating personnel, and thus, in an increase in machining costs.

SUMMARY OF THE INVENTION

With regard to this issue, the invention addresses the problem of providing a tool turret that is particularly efficient and cost-effective to use.

According to the invention, this problem is basically solved by a tool turret according to the invention intended for an automated tool change process. In at least one work station of the tool disk, a holder intended for receiving a machining tool can be attached to the tool disk in a re-detachable manner by a clamping device assigned to the individual work station. In an adjusting position of the tool disk that differs from the working position, the individual clamping device can be activated or deactivated while leaving the holder on the tool disk. In a changing position of the tool disk different from the working and adjusting positions, the relevant clamping device unlocks the holder in such a way that it can be removed from the tool disk and replaced by another holder to be used. Because the relevant clamping device can be activated or deactivated as a function of the movement of the work station into an adjusting position and into a changing position provided for a tool change, the tool change process is machine-controlled until the tool to be changed is unlocked in the changed position. If a handling robot is used to remove the tool to be changed in the change position and insert the new tool, a fully automatic tool change, and thus, the unmanned operation of the entire system can be achieved. The automatic tool change reduces the set-up costs and results in a corresponding reduction of man hours and labor costs.

In advantageous exemplary embodiments, the clamping device is stationarily immobilized at the circumference of the tool disk and has a hydraulically actuated clamping ring, which can be used to exert an axial immobilization force on the assigned holder.

Advantageously, the arrangement can be such that the individual clamping device has an energy storage device, which, after removal of the immobilization force, supports the return movement of the clamping ring to its position unlocking the holder. As a self-resetting device, the clamping device can be implemented in a simple and compact design.

To hydraulically actuate the clamping ring, a hydraulic chamber can advantageously be provided in a receiving housing of the clamping ring.

The chamber pressure of the hydraulic chamber can be adjusted via a hydraulic piston that can be actuated by an actuating device.

The clamping device can be designed in a particularly simple and compact way if the actuating device has a set screw, which moves the hydraulic piston into the hydraulic chamber with increasing penetration depth of the screw into the receiving housing of the clamping ring, thereby increasing the chamber pressure. The chamber pressure decreases again with reduced penetration depth of the set screw.

In advantageous exemplary embodiments, a drive, preferably in the form of an electric motor, is integrated into the tool disk. The drive drives a drive shaft. An adjusting device can be used to move the drive shaft longitudinally from an engaged position into a disengaged position and vice versa within the tool disk, and. The drive shaft is used to drive a machining tool received in the holder in an engaged position if the tool disk is in its working position and to actuate the set screw of the clamping device in the adjusting position of the tool disk. The drive shaft is used to both drive the tool and actuate the clamping device.

In advantageous exemplary embodiments, the adjusting device for the longitudinal travel of the drive shaft has an actuating piston that can be controlled hydraulically and that moves the drive shaft from the engaged to the disengaged position against the force of a further energy storage device. This energy storage device returns the drive shaft into the engaged position when the hydraulic actuating piston is depressurized.

In advantageous exemplary embodiments, the drive shaft has a further clutch end at its longitudinally displaceable clutch end, which is used for engaging and disengaging the clutch. In the change position of the tool disk, rotated by a predetermined swivel angle, the longitudinally displaceable clutch end opens and closes a bayonet fitting between holder and clamping device for replacing the holder by a different holder.

The arrangement can advantageously be such that the bayonet fitting in a receptacle of the clamping device for the holder has at least one immobilization projection. The one immobilization projection moves along an assignable longitudinal guide of the holder into an engagement position. After swiveling the receptacle of the clamping device by the drive shaft and closing the bayonet fitting, the immobilization projection reaches an immobilization position in which the holder is received in the clamping device. The bayonet fitting can be released again in reverse sequence.

At least in the working position of the tool disk, the holder is immobilized in axial and radial direction hydraulically by the clamping device and/or mechanically via the bayonet fitting.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 2a is a partial cross-section of the area marked IIa in FIG. 2 enlarged in comparison to FIG. 2;

FIG. 3a is a partial cross-section of the area marked IIIa in FIG. 3 enlarged in comparison to FIG. 3;

FIG. 4 is a side view in section of a separately shown clamping device of the tool disk;

FIGS. 5 and 6 are perspective views of the clamping device of FIG. 4, viewed towards the side on the inside with respect to the tool disk and/or on the outer side of the clamping device;

DETAILED DESCRIPTION OF THE INVENTION

Figure 1:
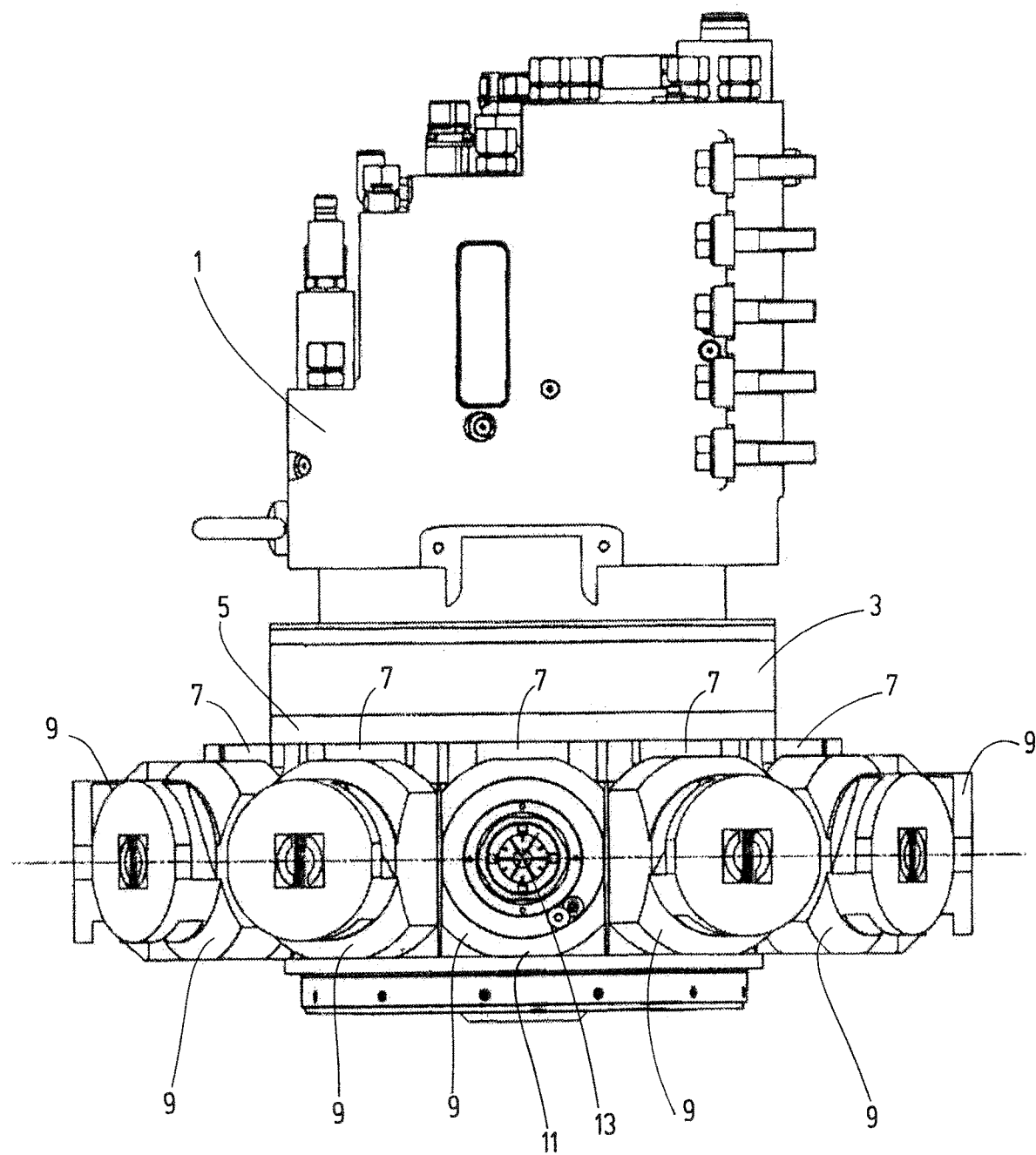
FIG. 1 is a plan view of a tool turret according to an exemplary embodiment of the invention.

In FIG. 1, which shows the exemplary embodiment of the invented tool turret, a base body 1 can be connected to a machine tool (not shown). The base body 1 has a circular cylindrical central part 3 concentric to a turret axis, on which a tool disk 5 is rotatably installed around the turret axis. On the outer circumference, the tool disk 5 has twelve work stations 7, five of which are visible in the plan view of FIG. 1. To each of work station, a holder 9 intended for receiving a machining tool can be detachably immobilized. Of the holders 9, of which seven are visible in FIG. 1, only one holder 9, which is in the central working position in FIG. 1 and marked 11, is equipped with a machining tool 13.

Figure 2:
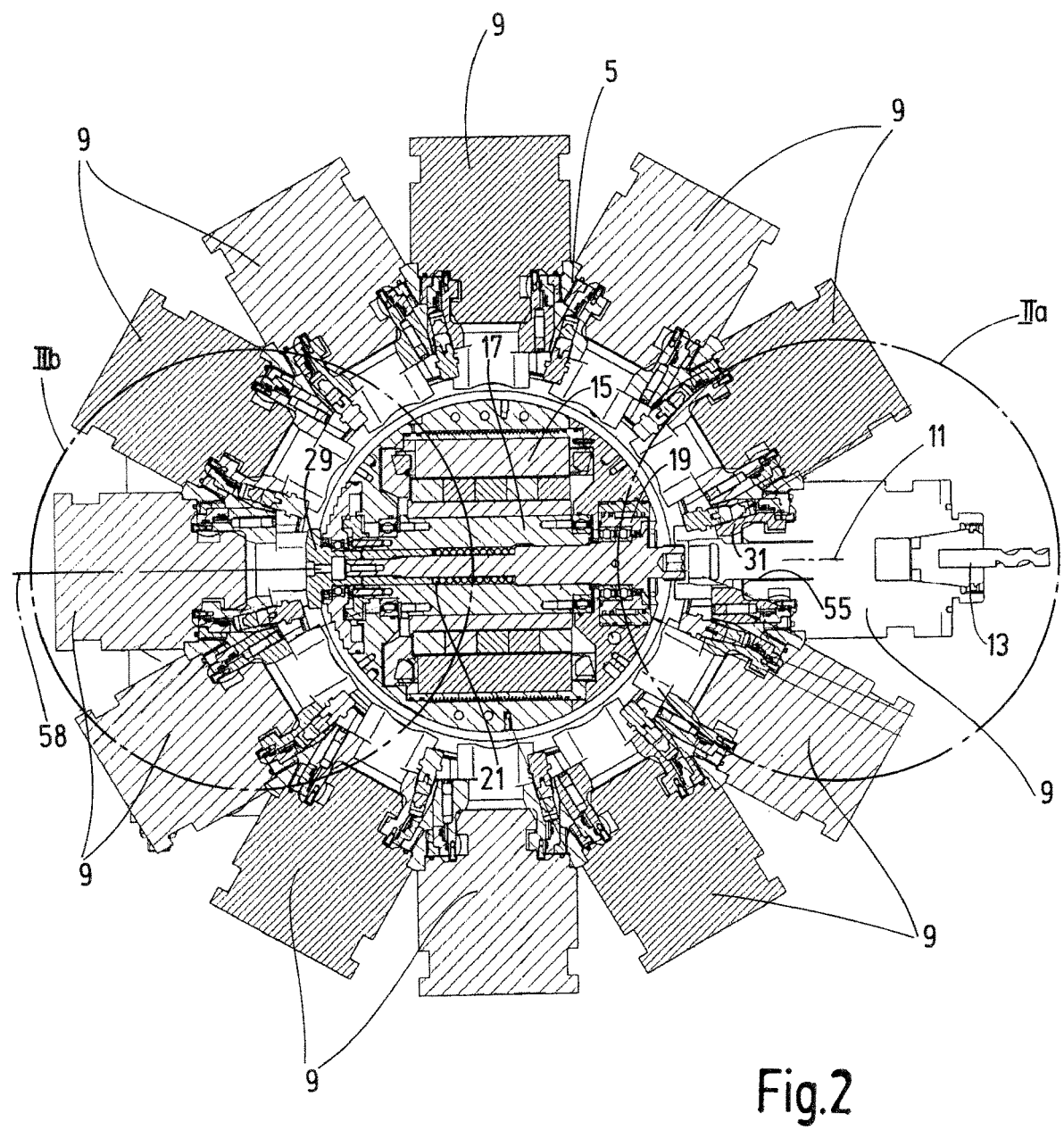
FIG. 2 is a partially schematically simplified side view in section of the tool disk of the exemplary embodiment of the tool turret extending in a radial plane, wherein a tool holder is shown in the working position.

In FIG. 2, which shows the tool disk 5 in a central cross-section having a radial sectional plane, the working position 11 is in the "3 o'clock" position, relative to the orientation of the drawing sheet of FIG. 2, As in FIG. 1, the holder 9 located in the working position 11 is equipped with a machining tool 13 in the form of a milling tool. As in FIG. 1, the other holders 9 are not shown equipped with machining tools 13 for the sake of clarity of the drawing, and in FIG. 2, as well as in FIG. 3, the holders 9 are schematically simplified. The design of the holders 9 is described in more detail below with reference to FIGS. 7 and 8.

Figure 2B:
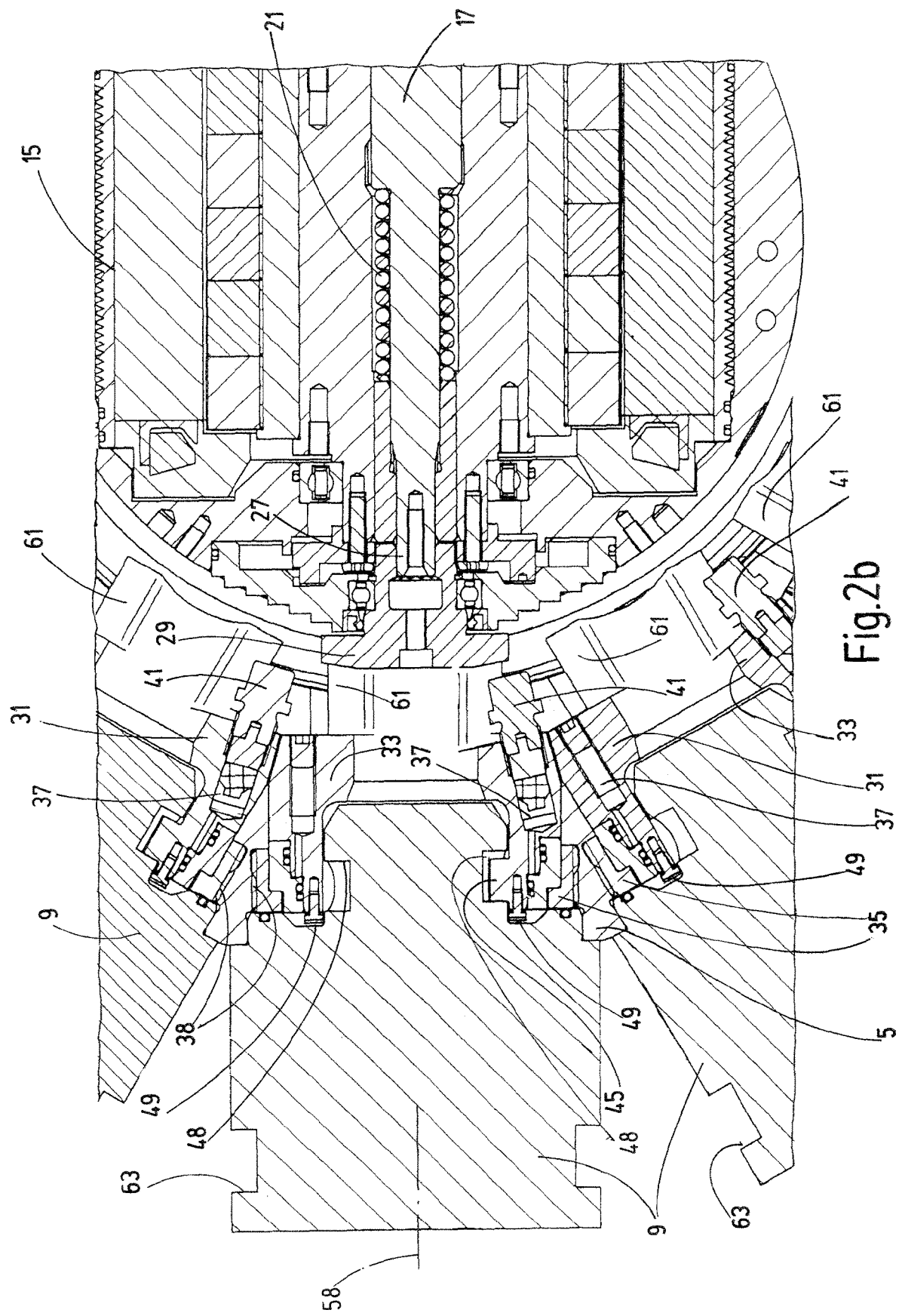
FIG. 2b is a partial cross-section of the area marked IIb in FIG. 2 enlarged in comparison to FIG. 2.
Figure 3:
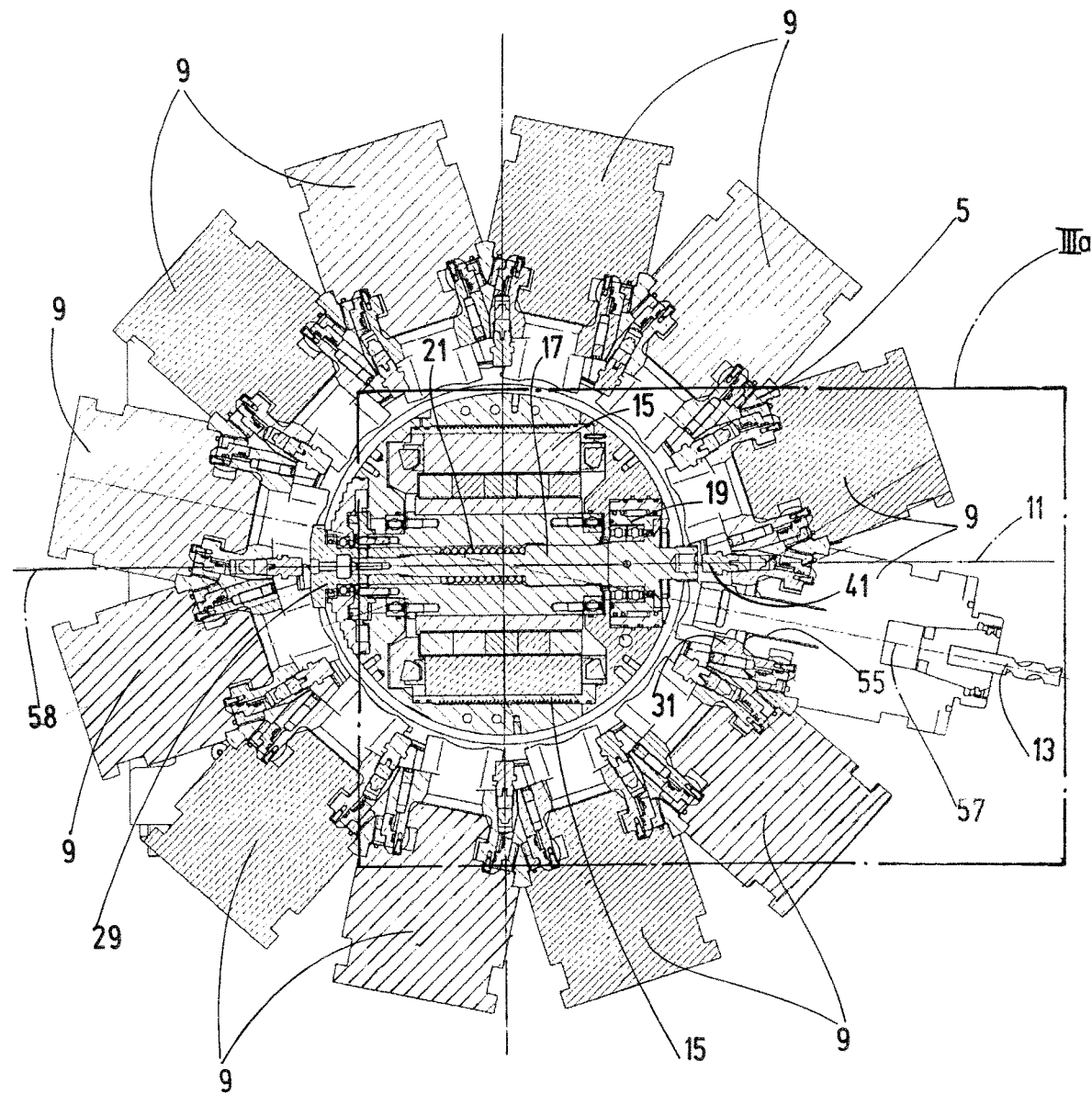
FIG. 3 is a partially schematically simplified side view in section of the tool disk of FIG. 2, wherein a tool holder is in the adjusting position swiveled by 12° relative to the working position.

The tool turret has a direct drive in the form of an electric motor 15 integrated into the tool disk 5. The electric motor 15 drives a drive shaft 17, which not only provides the tool drive for a rotating machining tool 13, but also the drive for the automatic tool changing processes. For this purpose, the electric motor 15 can be controlled in terms of speed, direction of rotation and angle of rotation increments. The drive shaft 17 can be axially displaced between a disengaged position and an engaged position by a sliding clutch 19, the details of which can be more clearly seen in FIGS. 2a and 3a. The drive shaft 17 is pretensioned by a compression spring 21 for movement into the engaged position. As FIGS. 2a and 3a show, the sliding clutch 19 has a pressure chamber 23 for hydraulic actuation, which, when supplied with pressure by the hydraulic system of the tool turret, moves the drive shaft 17 in conjunction with its bearing unit 25 against the force of the pressure spring 21 into the disengaged position shown to the left in the figures. In the disengaged position shown, the second clutch end 27 opposite the sliding clutch 19 is in clutch engagement with a pivoted dihedron 29, as shown best in FIG. 2b, which is used to re-disengage the clutch end 27 when the drive shaft 17 assumes the engaged position. The rotatory dihedron 29, which is in the "9 o'clock" position, i.e. in the tool changing position in relation to the orientation of FIGS. 2 and 3, causes, as explained below, the closing and opening of a bayonet fitting immobilizing the relevant holder 9 by turning.

Figure 8:
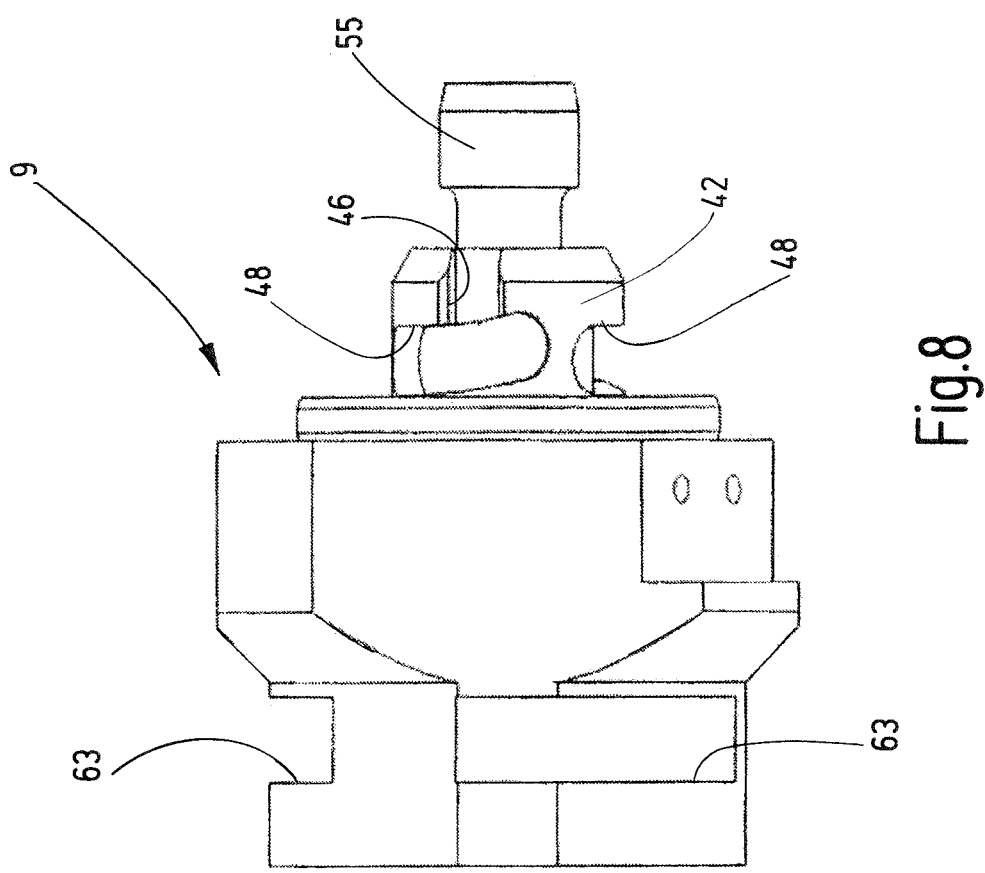
FIG. 8 is a side view of the tool holder of FIG. 7.
Figure 7:
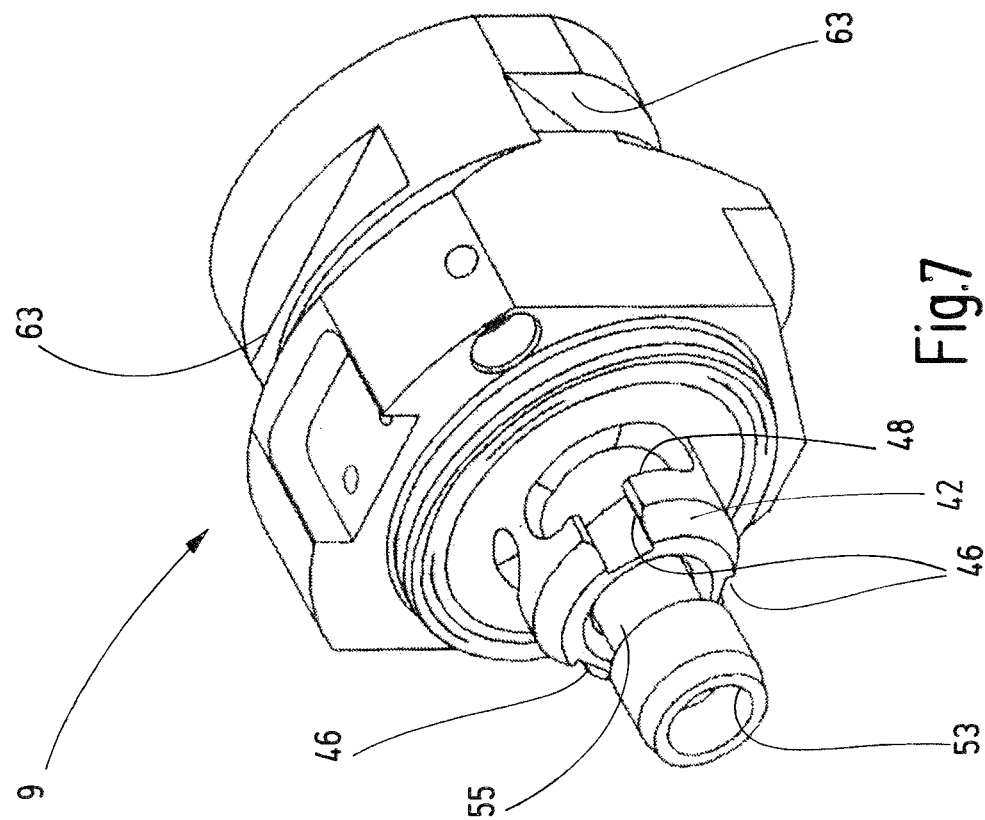
FIG. 7 is a perspective view of a tool holder shown separately, viewed towards the side on the inside with respect to the tool disk.

The holders 9 are attached to the individual work stations 7 by clamping devices fixed on the tool disk 5, each formed by a clamping ring 31, the design of which is most clearly shown in FIGS. 4 to 6. As shown, the clamping ring 31 has a shell part 33, which forms the receiving housing for the holder 9 to be immobilized, as well as an outer ring 35, which surrounds the shell part 33 at the input end for the individual holder 9. The outer ring 35 has an external thread 38, as shown in FIGS. 2a and 3a, which is used to bolt it to the tool disk 5 such that the outer ring 35 forms the stationary part of the clamping ring 31. For a hydraulically actuated clamping procedure, a hydraulic chamber 37 (see FIG. 4) is formed in shell part 33. The chamber pressure of hydraulic chamber 37 can be adjusted via a hydraulic piston 39, which can be actuated by an actuating device. It has a set screw 41 having a hexagon head 43. The chamber pressure in the hydraulic chamber 37 increased by turning the set screw 41 clockwise causes a displacement of the shell part 33 relative to the stationary outer ring 35, to the right in FIG. 4. By three immobilization projections 45, which protrude radially inwards on the inside of the receiving space of the shell part 33, a clamping operation is effected via a bayonet fitting formed between the shell part 33 and the holder 9. As FIGS. 7 and 8 show, the holder 9 has longitudinal guides 46 to form the bayonet fitting on a shaft part 42. Shaft part 42 can be received in the receiving space of the shell part 33 and surrounds a spindle shaft 55 of the holder 9. Through longitudinal guides 46, the immobilization projections 45 penetrate when the holder 9 is inserted into the receiving space and reach a position above the holding surfaces 48 of the shaft part 42 when the holder 9 is turned, such that a closed bayonet fitting is formed by the immobilization parts 45 and the holding surfaces 48 and the hydraulic clamping force is effective between the immobilization parts 45 and holding surfaces 48. The clamping movement of the shell part 33, which is executed using a short stroke length, counteracts the effect of a leaf spring ring 47, which is fastened to the opening edge of the shell part 33 by bolts 49 and is supported on the outer ring 35 by lugs 51 projecting radially outward. When the chamber pressure in the hydraulic chamber 37 is reduced by turning the set screw 41 counterclockwise, the shell part 33 is then returned from the clamping position, i.e. the immobilization projections 45 no longer bear tightly against the holding surfaces 48 and the bayonet fitting formed can be released again by turning the holder 9. As mentioned above, FIGS. 2 and 3 show the drive shaft 17 in the disengaged state. For the drive of the machining tool 13 of the holder 9 immobilized in the working position in FIGS. 2 and 2a, the drive shaft 17 moved into the engaged position with the assigned clutch end comes into clutch engagement with a clutch part 53 of the spindle shaft 55 of the relevant holder 9.

Starting from the tool disk 5 equipped with holder 9, the tool changing process, in which the machining tool 13 of the holder 9, which is in the working position 11 shown in FIGS. 2 and 2a, is to be exchanged, is performed in several stages. The tool disk 5 is swiveled clockwise by 12° when the drive shaft 17 is in the disengaged position such that the hexagon socket 59 at the clutch end of the drive shaft 17 is in alignment with the hexagon head 43 of the set screw 41 of the assigned clamping device 31. By depressurizing the pressure chamber 23 of the sliding clutch 19, the compression spring 21 moves the drive shaft 17 into the engaged position resulting in the hexagon socket 59 at the clutch end of the drive shaft 17 engaging with the hexagon head 43 of the set screw 41 in a clutch manner. By turning the drive shaft 17 in the opposite direction, the set screw 41 is turned counterclockwise, reducing the chamber pressure in the hydraulic chamber 37, and in that way the clamping force of the tensioning device 31 is released with the aid of the restoring force of the spring ring 47. The holder 9 is now secured without hydraulic clamping force solely by the bayonet fitting formed between the immobilization projections 45 of the clamping ring 31 and the holding surfaces 48 of the holder 9. Using the sliding clutch 19, the drive shaft 17 is now again moved into the disengaged position against the force of the pressure spring 21, and the tool disk 5 is swiveled clockwise until the holder 9 to be exchanged is in the change position 58, i.e. in the "9 o'clock" position. As shown most clearly in FIG. 2b, in this position the lateral arms of the dihedron 29 extend into the space between side walls 61, which protrude in the form of partial cylinders at the inner end face of the shell part 33 of the clamping ring 31, cf. FIGS. 4 to 6. When the drive shaft 17 is disengaged, it is in clutch engagement with the clutch end 27 facing the dihedron 29 and the dihedron 29.

A robot accesses this holder 9 to be changed via gripping grooves 63 (FIGS. 7 and 8), which are located on the holder 9. The bayonet fittings 45, 48 are now unlocked by turning the drive shaft 17 by 120°, i.e. then the robot can remove the holder 9. The robot places the holder 9 in a magazine and picks up the holder 9 of the new tool 13 to be used and positions this holder 9 in the change position 58. The dihedron 29 is used to close the bayonet fitting again by turning the shell part 33 by approximately 120°. The robot then unlocks the holder 9. By turning the tool disk 5, the holder 9 having the tool 13 to be used is swiveled into the adjusting position 57, in which the facing clutch end of the drive shaft 17 is flush with the set screw 41 of the clamping ring 31.

By transferring the drive shaft 17 into the engaged position, the holders 9 of the new tool 13 can now be hydraulically clamped by turning the set screw 41 clockwise, along the lines of the loosening process. After transferring the drive shaft 17 to the disengaged position, the tool disk 5 can swivel the exchanged holder 9 back to the working position 11, thereby completing the tool changing process and the drive shaft 17 can be moved to the engaged position to drive the exchanged machining tool 13.

While one embodiment has been chosen to illustrate the invention, it will be understood by those skilled in the art that various changes and modifications can be made therein without departing from the scope of the invention as defined in the claims.

The invention claimed is:

1. A tool turret for an automated tool change process in a machine tool, the tool turret comprising:
   a tool disk being rotatable by a drive about a rotational axis and having a work station that is rotatable with the tool disk between a work position, an adjusting position and a changing position;
   a rotatable drive shaft;
   a holder that receives a machining tool, the holder being releasably fixed on the tool disk; and
   a clamp that is mounted on the tool disk and that receives the holder, the clamp being able to be activated and deactivated when disposed in the adjusting position through rotation of the drive shaft, and when the clamp is activated, the holder is immobilized with respect to the tool disk by friction exerted on the holder by the clamp;
   in the work position of the tool disk, the machining tool being driven by the drive shaft to machine a workpiece;
   in the adjusting position of the tool disk, the adjusting position being rotationally spaced from the work position, when the clamp has been deactivated, the holder is no longer immobilized with respect to the tool disk but is left securely engaged on the tool disk by a positive fit lock; and
   in the changing position of the tool disk, the changing position being rotationally spaced from the work position and from the adjusting position, after the clamp has been deactivated from the holder in the adjusting position, the positive fit lock is dis-engageable and the holder is removable from the tool disk and replaceable by another holder that is to be used.

2. The tool turret according to claim 1 wherein the clamp is stationarily immobilized at a circumference of the tool disk and has a hydraulically actuated clamping ring capable of exerting an immobilization force on the holder.

3. The tool turret according to claim 2 wherein the clamp has an energy storage biasing a return movement of the clamping ring to a release position releasing the clamp from the holder after removal of the immobilization force.

4. The tool turret according to claim 2 wherein a hydraulic chamber in a receiving housing of the clamping ring hydraulically actuates the clamping ring by a chamber pressure in the hydraulic chamber, the chamber pressure being adjustable via a hydraulic piston in the hydraulic chamber actuated by an actuator.

5. The tool turret according to claim 4 wherein the actuator comprises a screw moving the hydraulic piston into the hydraulic chamber with increasing penetration depth of the screw into the receiving housing of the clamping ring, thereby increasing the chamber pressure, the chamber pressure decreases again with reduced penetration depth.

6. The tool turret according to claim 5 wherein the drive comprises an electric motor being integrated into the tool disk and rotating the drive shaft;
   an adjuster moves the drive shaft longitudinally from an engaged position into a disengaged position and vice versa within the tool disk; and
   the drive shaft is capable of driving the machining tool received in the holder in the engaged position when the clamp of the tool disk is in the work position and is capable of actuating the screw of the clamp when the clamp is in the adjusting position of the tool disk.

7. The tool turret according to claim 6 wherein the adjuster comprises a hydraulic actuating piston being controlled hydraulically and moving the drive shaft from the engaged position to the unengaged position against the force of a drive energy storage, the drive energy storage returning the drive shaft into the engaged position when the hydraulic actuating piston is depressurized.

8. The tool turret according to claim 7 wherein
the positive fit lock is a bayonet connection;
the drive shaft has a longitudinally displaceable clutch end capable of engaging and disengaging the clamp and rotating the clamp when the drive shaft and the holder are engaged; and
in the changing position of the tool disk, the clamp is rotatable by a predetermined swivel angle to open and close the bayonet connection between the holder and the clamp for replacing the holder by the another holder.

9. The tool turret according to claim 8 wherein
the bayonet connection is in a receptacle of the clamp for the holder and has a immobilization projection movable along a longitudinal guide on the holder into an engagement position;
whereby, after swiveling the receptacle of the clamp by rotation of the drive shaft, the bayonet connection is capable of being closed and is capable of reaching an immobilization position in which the holder is locked in the clamp and whereby the bayonet connection is capable of being released again in reverse sequence.

10. The tool turret according to claim 8 wherein
in at least the work position of the tool disk, the holder is immobilized in axial and radial directions hydraulically by the clamp and mechanically via the bayonet connection.

11. The tool turret according to claim 1 wherein
upon de-activation of the clamp in the adjusting position, the holder is rotatably movable relative to the tool disk.

12. The tool turret according to claim 1 wherein
upon de-activation of the clamp in the adjusting position, the holder is axially and rotatably movable relative to the tool disk.

* * * * *